US009955635B1

(12) United States Patent
Sanders

(10) Patent No.: US 9,955,635 B1
(45) Date of Patent: May 1, 2018

(54) METHOD AND APPARATUS FOR REPLACEMENT OF LAWN SPRINKLER UNITS

(71) Applicant: James R Sanders, Amarillo, TX (US)

(72) Inventor: James R Sanders, Amarillo, TX (US)

(73) Assignee: James R. Sanders, Amarillo, TX (US)

( * ) Notice: Subject to any disclaimer, the term of this patent is extended or adjusted under 35 U.S.C. 154(b) by 179 days.

(21) Appl. No.: 14/544,843

(22) Filed: Feb. 26, 2015

(51) Int. Cl.
*B25B 27/00* (2006.01)
*B25B 27/14* (2006.01)
*B21D 39/04* (2006.01)
*B23P 19/04* (2006.01)
*A01G 25/00* (2006.01)
*B23P 6/00* (2006.01)

(52) U.S. Cl.
CPC .............. *A01G 25/00* (2013.01); *B25B 27/14* (2013.01); *B23P 6/00* (2013.01); *B23P 19/04* (2013.01); *B25B 27/00* (2013.01); *Y10T 29/53909* (2015.01); *Y10T 29/53913* (2015.01); *Y10T 29/53917* (2015.01); *Y10T 29/53983* (2015.01); *Y10T 29/53987* (2015.01)

(58) Field of Classification Search
CPC ........... B25B 27/00; B25B 27/02; B25B 9/00; B25B 27/28; B25B 27/10; B25B 27/16; B25B 11/02; B25B 27/14; B21K 25/00; B23P 19/04; B23P 6/00; B23Q 3/103; B23K 37/0443; B60B 29/001; F16L 1/10; Y10T 29/53909; Y10T 29/53913; Y10T 29/53917; Y10T 29/53961; Y10T 29/53978; Y10T 29/53983; Y10T 29/53987

USPC ........ 29/270, 271, 272, 281.1, 281.5, 281.6, 29/282, 402.08, 402.09, 402.11, 402.12, 29/402.15, 402.14, 402.17
See application file for complete search history.

(56) References Cited

U.S. PATENT DOCUMENTS

| | | | | | |
|---|---|---|---|---|---|
| 3,977,063 | A | * | 8/1976 | Bruninga | B05B 15/10 239/205 |
| 4,562,962 | A | * | 1/1986 | Hartman | B05B 1/3006 137/68.14 |
| 4,788,894 | A | * | 12/1988 | Mitschele | A01G 25/00 294/50.7 |
| 5,613,802 | A | * | 3/1997 | Farrell | A01G 25/02 405/36 |
| 6,446,531 | B1 | * | 9/2002 | Colombani | B25B 13/48 81/125.1 |
| 6,957,477 | B1 | * | 10/2005 | Neiman | B25B 27/14 29/278 |
| 8,997,323 | B1 | * | 4/2015 | Sanders | B65G 65/00 29/255 |
| 2008/0115633 | A1 | * | 5/2008 | Sweat | B25B 13/5083 81/444 |
| 2013/0333217 | A1 | * | 12/2013 | Curry | B23P 6/00 29/890.14 |

* cited by examiner

*Primary Examiner* — Sarang Afzali
*Assistant Examiner* — Darrell C Ford

(57) ABSTRACT

A process, using simple tools, is provided for the removal and replacement of lawn sprinkler units in a manner that facilitates alignment of threaded components and prevents entrance of lawn soil into water distribution piping that feeds the sprinkler units.

5 Claims, 3 Drawing Sheets

METHOD AND APPARATUS FOR REPLACEMENT OF LAWN SPRINKLER UNITS

RELATED APPLICATIONS

This application is a continuation-in-part of U.S. patent application Ser. No. 13/506,582 filed on May 1, 2012.

BACKGROUND OF THE INVENTION

1. Field of the Invention

This invention concerns the servicing of an underground watering system for grass lawns, and more particularly relates to a method for replacing sprinkler units associated with an underground watering system without detrimental effect upon said system.

2. Description of the Prior Art

Underground watering systems are commonly utilized for accurately and controllably spraying water onto grass lawns. Such systems generally employ water supply pipes arranged as a substantially horizontal network installed about one to two feet below the lawn. At strategic intervals and locations, riser pipes are vertically emergent from the supply pipes, and terminate in male threaded extremities that extend into cylindrical holes bored through the ground surface into the soil beneath the grass.

A sprinkler unit is attached to the upper extremity of each riser pipe. The sprinkler unit is comprised of a hollow cylindrical housing component, generally of plastic construction, having a centered bottom female threaded aperture adapted to screw onto the threaded upper extremity of the riser pipe, and an externally threaded upper extremity.

A head component assembly is removably interactive with said housing component, having a circular cap adapted to be positioned adjacent the ground, surface and having an internally threaded shoulder that engages the externally threaded upper extremity of said housing component. Said head component is further comprised of a cylindrical tube slidably secured within a centered hole in said cap, and adapted to rise in response to water pressure to a height 3-4 inches above the ground surface. A coil spring, surrounding said tube, is biased to draw the tube downwardly when water pressure is released. In operation, when said cylindrical tube is caused to rise, water is directionally sprayed from an apertured plug atop said tube.

In the course of foot and/or vehicle traffic upon a lawn and mowing and other lawn grooming operations, the sprinkler units become damaged, and require replacement. The first step in removing a sprinkler unit is to remove the head component by unscrewing said cap and lifting the head assembly. The next step is to unscrew said housing component from its threaded joinder with the associated riser pipe, and lift it out of the cylindrical hole that accommodates the sprinkler unit.

However, when the housing component is removed, soil can enter the riser pipe and thereby jeopardize the entire watering system. Also, another problem arises when it is sought to install a new housing component because it is extremely difficult to align the bottom female threaded extremity of the housing component with the male threaded extremity of the associated riser pipe.

A further challenging factor is that, whereas considerable torque force must be applied to the housing component to produce tightly threaded joinder with the associated riser pipe, no lever arm tool can be employed such as a conventional wrench having a jaw and a coplanar handle extending orthogonally to the rotational axis of the work piece. Any tool employed to achieve threaded release and subsequent re-installation of the housing component must be capable of reaching into the hole, applying torque force, and gripping the released component for upward removal.

It is accordingly an object of the present invention to provide a method and apparatus for replacing a lawn sprinkler without allowing soil to enter an associated underlying riser pipe.

It is a further object of this invention to provide a method and apparatus for aligning a housing component of a lawn sprinkler with its associated riser pipe to achieve compatibility of threaded features.

It is a still further object of the present invention to provide apparatus for the removal of a damaged lawn sprinkler unit from an underground watering system, and install a new unit in its place.

It is another object of the present invention to replace a lawn sprinkler unit installed in a vertically elongated cylindrical hole in the soil beneath a lawn without disturbing said soil.

SUMMARY OF THE INVENTION

A process and apparatus is provided for replacing components of a lawn sprinkler unit emplaced in a vertically elongated cylindrical hole in soil underlying said lawn, said sprinkler unit comprised of a tubular housing component having a bottom extremity with an axially centered internally threaded aperture, and a top extremity adapted to be positioned adjacent the top of said hole and threadably interactive with a head component having means for emitting water radially outward, said sprinkler unit being removably joined to an underground horizontally extending water conduit by way of a riser pipe upwardly directed from said conduit and terminating in a male threaded extremity adapted to engage the internally threaded aperture of said housing component, said process comprising:

1) axially twisting said head component to produce release from said housing component, and lifting and removing said released head component, 2) inserting downwardly through the remaining housing component a rigid cylindrical rod, and causing the lower extremity of said rod to penetrate said internally threaded aperture and enter said riser pipe in close fitting engagement therewith, 3) axially twisting and upwardly removing said housing component in sliding engagement with said rod, during which action the insertive position of said rod prevents soil from entering said conduit, 4) installing a new, substantially identical housing component by downward sliding motion along said rod, whereby said rod provides alignment of said male threaded extremity of the riser pipe with the internally threaded aperture of said housing component, and axially twisting said housing component to produce secure engagement, 5) upwardly removing said rod from said secured housing component, and 6) installing a new, substantially identical head component by axial rotation to cause interengagement with the top extremity of said housing component.

The twisting and lifting of said housing component is accomplished by employing an elongated hollow tool which embraces the rod and engages the top extremity of the housing component without dislodging soil from the wall of the hole.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
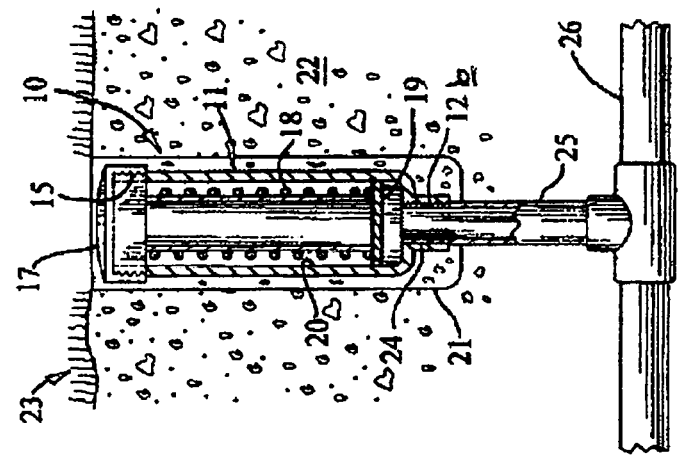
FIG. 1 is an exploded side view of a lawn sprinkler unit of commonplace construction.
Figure 2:
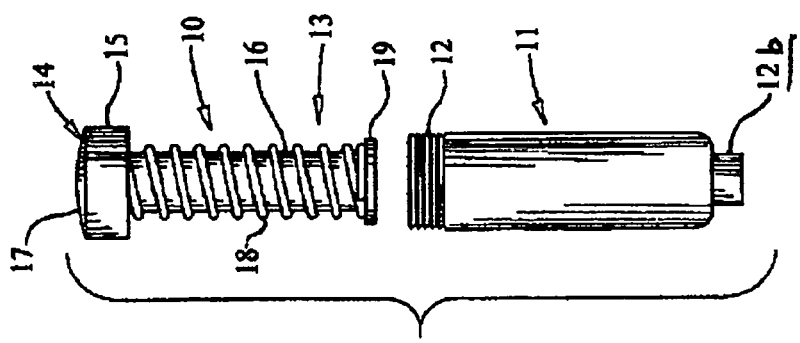
FIG. 2 is a sectional side view of the unit of FIG. 1 emplaced in a hole in a lawn and interactive with an underground watering system.

Referring now to FIGS. 1 and 2, a lawn sprinkler unit 10 of commonplace design is shown comprised of hollow housing component 11 having a centered bottom female threaded aperture 32 and externally threaded upper extremity 12; and a head component assembly 13 having a circular cap 14 with an internally threaded shoulder 15 that engages said externally threaded upper extremity 12. A cylindrical tube 16 is positioned below cap 14 and adapted to slide upwardly through a centered circular aperture 17 in said cap in response to pressurized water entering said housing component. A coil spring 18, having an upper extremity that is secured within cap 14, is wrapped around tube 16 and adapted to retract tube 16 downwardly upon release of water pressure. A retainer ring 19 at the bottom of tube 16 holds spring 18 in place and provides tracking stability by interaction with the interior wall 20 of housing component 11. The upper extremity of said housing component terminates in a circular rim bounded by interior and exterior perimeter edges 34 and 33, respectively.

In its properly installed state, unit 10 is installed within vertical hole 21 in the soil beneath a lawn 23. Such installation is by virtue of tight-fitting engagement of threaded aperture 12b with the male threading 24 of a riser pipe 25 upwardly emergent from supply conduit 26.

Figure 3:
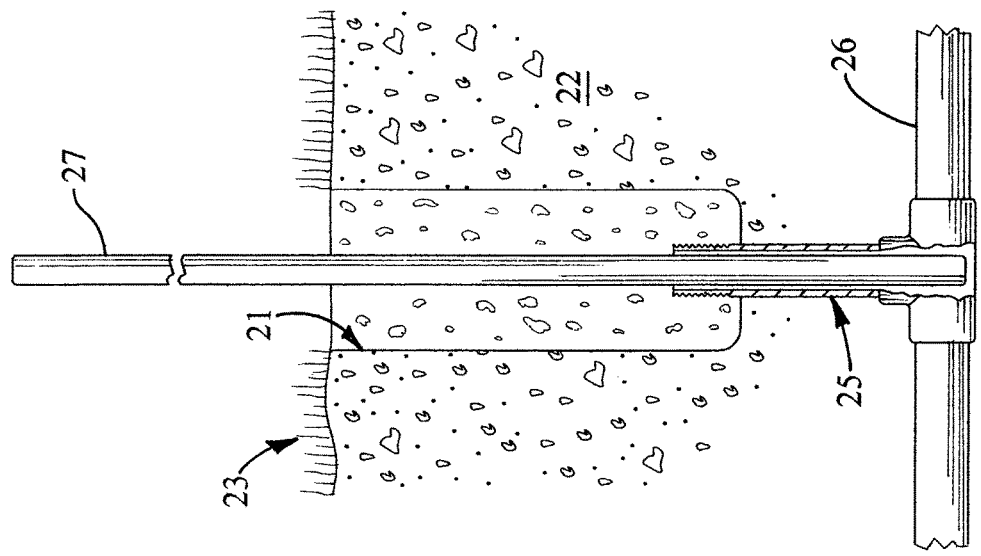
FIG. 3 illustrates an intermediate stage in the removal of a sprinkler unit from its hole and the positioning of apparatus for said removal.
Figure 4:
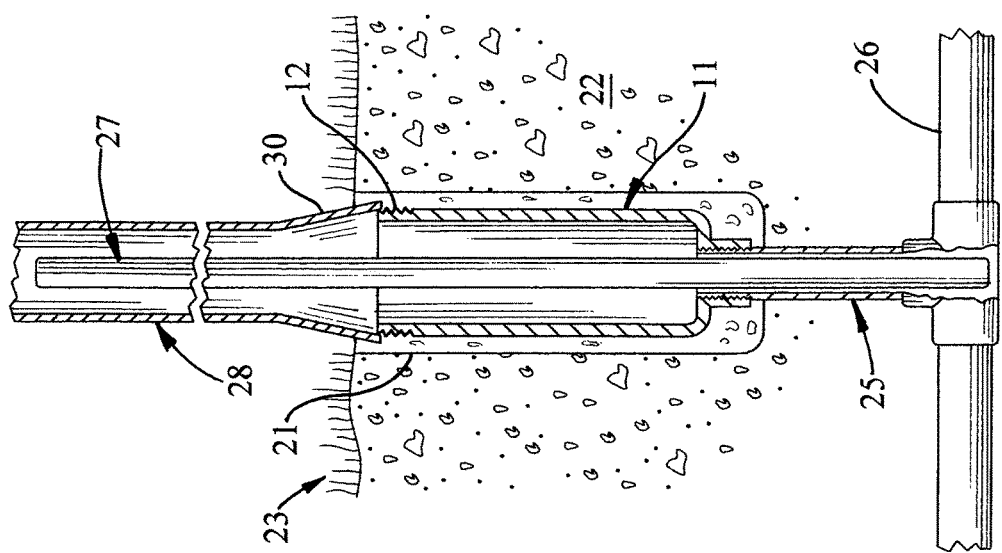
FIG. 4 illustrates a stage in the sequence of steps to replace said sprinkler unit.

In the initial step of replacement, cap 14 is unscrewed, and head assembly 13 is upwardly removed. In a second step, a cylindrical rod 27 is downwardly inserted, achieving close-fitting clearance with the inside wall of riser pipe 25. In a third step, as shown in FIG. 3, housing component 11 is unscrewed from said riser pipe, employing an elongated hollow tool 28 having a lowermost extremity 30 that frictionally grips upper extremity 12 of said housing component. A suitable tool is described in patent application Ser. No. 13/506,582, now issued as U.S. Pat. No. 8,997,323. Such actions leave hole 21 in a substantially undisturbed state with rod 27 preventing ingress of soil into riser pipe 25, as shown in FIG. 4.

Figure 5:
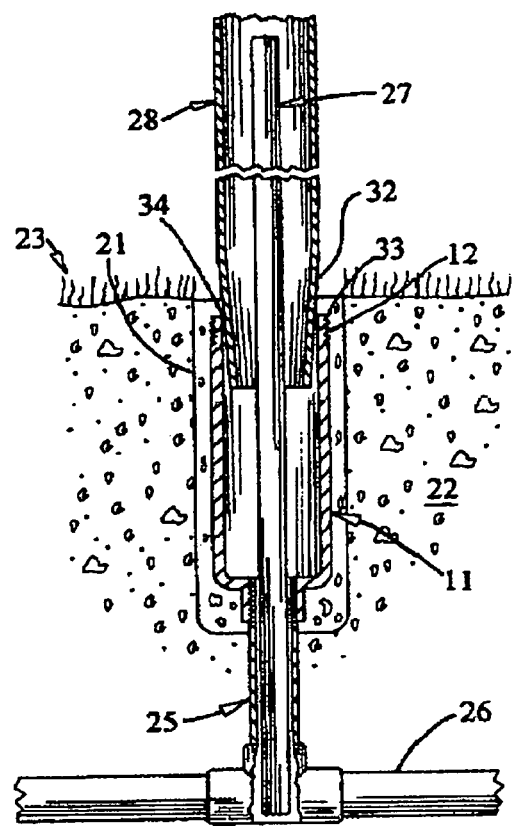
FIG. 5 illustrates an alternative embodiment of apparatus for use in the method of this invention.

The embodiment of tool 28 exemplified in FIG. 3 may be a pipe whose lowermost extremity 30 is outwardly flared by way of a swaging process to form a conically tapered surface adapted to grip the exterior perimeter 33 of the upper extremity 12 of housing component 11. An alternative embodiment of said tool is shown in FIG. 5 having a lowermost extremity 32 having a conical shape downwardly and inwardly tapered with respect to the axis of elongation of the tool, and thereby adapted to frictionally interact with the interior perimeter 34 of said upper extremity 12. The gripping of said interior perimeter may also be achieved by opposed tapered vanes. Cylindrical rod 27 preferably has a smooth exterior surface. However, a commonly available threaded rod may also be employed.

The installation of a replacement sprinkler unit is achieved by reversal of the aforesaid removal sequence. Specifically, a new housing component is caused to slide down rod 27 into abutment with riser pipe 25. This produces precise alignment of the threading of aperture 32 with the male threading of riser pipe 25. Tool 28 is employed to produce tight-fitting interengagement of the housing component with the riser pipe. Rod 27 is then removed, and a replacement head component is entered into threaded engagement with the upper extremity 12 of said housing component.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:
1. A process for replacing a lawn sprinkler unit emplaced in a vertical hole in soil underlying a lawn, said lawn sprinkler unit comprised of a tubular housing component having a bottom extremity with an axially centered internally threaded aperture and a top extremity threadably interactive with a head component having means for emitting water radially outward, said lawn sprinkler unit being removably joined to an underground horizontally extending water conduit by way of a riser pipe upwardly directed from said conduit and terminating in a male threaded extremity adapted to engage the internally threaded aperture of said housing component, said process comprising:
   1) axially twisting said head component, releasing the head component from said housing component, and lifting and removing said head component,
   2) inserting downwardly through said housing component a rigid cylindrical rod, causing the lower extremity of said rigid cylindrical rod to penetrate said internally threaded aperture and enter said riser pipe in close fitting engagement therewith,
   3) axially twisting and upwardly removing said housing component in sliding engagement with said rigid cylindrical rod, during which action of said rigid cylindrical rod prevents soil from entering said conduit,
   4) installing a new, substantially identical housing component by downward sliding motion along said rigid cylindrical rod, whereby said rigid cylindrical rod provides alignment of said male threaded extremity of the riser pipe with the internally threaded aperture of said housing component, and axially twisting said new, substantially identical housing component to produce secure engagement with the male threaded extremity of said riser pipe,
   5) upwardly removing said rigid cylindrical rod from said secured housing component, and

6) installing a new, substantially identical head component by axial rotation to cause interengagement with the top extremity of said new, substantially identical housing component.

2. The process of claim 1 wherein step 3, the axial twisting and upward removal of said housing component, is achieved by the use of an elongated hollow tool having a lowermost extremity that is conically tapered outwardly and downwardly in a manner to frictionally Interact with an exterior perimeter edge of the upper extremity of said housing component.

3. The process of claim 1 wherein step 3, the axial twisting and upward removal of said housing component Is achieved by the use of an elongated hollow tool having a lowermost extremity having opposed vanes that are inwardly and downwardly tapered in a manner to frictionally interact with an interior perimeter edge of the upper extremity of said housing component.

4. The process of claim 1 wherein said rigid cylindrical rod has a smooth exterior surface.

5. The process of claim 1, wherein said rigid cylindrical rod has a uniformly threaded exterior surface.

\* \* \* \* \*